United States Patent [19]

Smith

[11] 4,142,153
[45] Feb. 27, 1979

[54] TACHOMETER FOR MEASURING SPEED AND DIRECTION OF SHAFT ROTATION WITH A SINGLE SENSING ELEMENT

[75] Inventor: Larry B. Smith, Phoenix, Ariz.

[73] Assignee: Sperry Rand Corporation, New York, N.Y.

[21] Appl. No.: 769,750

[22] Filed: Feb. 17, 1977

[51] Int. Cl.² ............................................. G01P 3/52
[52] U.S. Cl. ................................. 324/165; 340/347 P; 324/166
[58] Field of Search ............... 324/173, 166, 174, 178, 324/179, 169, 15, 16 R, 40, 34 PS, 34 D, 164, 165; 340/342 P; 310/111

[56] References Cited

U.S. PATENT DOCUMENTS

| | | | |
|---|---|---|---|
| 3,112,464 | 11/1963 | Ratajski et al. | 310/111 X |
| 3,132,337 | 5/1964 | Martin | 340/347 P |
| 3,930,201 | 12/1976 | Ackermann et al. | 324/34 PS X |
| 3,969,677 | 7/1976 | Woyton | 324/166 X |

*Primary Examiner*—Rudolph V. Rolinec
*Assistant Examiner*—Vincent J. Sunderdick
*Attorney, Agent, or Firm*—Howard P. Terry

[57] ABSTRACT

A single proximity probe coil driven by a high frequency source excites eddy currents at the periphery of a conducting disc having one or more stair-stepped perturbations and detects the changing radial levels or distances of the perturbations as the disc rotates. The detected signal is processed to yield output signals representing shaft speed and direction of rotation.

8 Claims, 4 Drawing Figures

TACHOMETER FOR MEASURING SPEED AND DIRECTION OF SHAFT ROTATION WITH A SINGLE SENSING ELEMENT

BACKGROUND OF THE INVENTION

1. Field of the Invention

The invention generally relates to the measurement of rotational speed and is more particularly concerned with a simple unitary eddy current proximity sensing device cooperating with an electrically conductive rotor having a specially perturbated peripheral shape for providing shaft speed and direction of rotation in the form of electrical output signals.

2. Description of the Prior Art

While there are several choices available among prior art tachometers which supply an output voltage generally related to shaft speed, such devices are often not suitable for certain precision applications, such as in control moment gyroscopes or reaction wheel assemblies for use in communication or other space satellites of the class, for example, illustrated in the L. P. Davis U.S. Pat. No. 3,980,358 for "Axial Vibration Damper for Floating Bearings", issued September, 1976 and assigned to Sperry Rand Corporation, and in the art cited therein. Many prior art tachometer devices are characterized by excessive or variable friction effects that cannot be tolerated where such energy losses must be fully avoided. Additional disadvantages include a ripple voltage on the output signal, life shortening wear, and decreasing reliability with age. Alternating current tachometers exchange some of these defects for relatively poor linearity and a finite displacement error at zero speed; the output frequency varies among with the magnitude of the output signal.

Brushes and commutators or slip rings are avoided in other inductive types of shaft speed measurement devices known in the art in which no physical contact is made to rotatable parts. In one such device, at least one small magnet is disposed at the periphery of a rotor and induces signals in a probing coil located near the disc edge. However, the probe coil output amplitude is an inherent function of shaft speed, which severely limits the useful measurement range of the device, making it useless at low shaft speeds. In some cases, the magnets undesirably add inertia to particular kinds of rotating systems. Dynamic magnetic fields are also produced that may not be compatible with the proper operation of associated apparatus.

Commutated condenser tachometric devices are available which avoid friction, advantageously lacking direct mechanical-electrical contacts, in which a capacitor is repeatedly charged to one potential and is discharged to another through a current-measuring device, the consequent output pulses comprising a current whose unidirectional component is proportional to shaft speed. The output is non-linear and is erratic at low shaft speeds and, as in the instance of other prior art concepts, there is no simple or reliable indication of the direction of shaft rotation.

SUMMARY OF THE INVENTION

The present invention relates to the art of simultaneous measurement of both rotational speed and the sense or direction of rotation with a single detecting element. The unitary detecting element is a simple high frequency-driven proximity probe coil which excites high frequency currents at the peripheral edge of a conducting rotor which may be in the form of a disc having stair-stepped perturbations, detects the changing radial levels of those perturbations as the disc rotates, and provides a corresponding electrical output signal. A simple processing circuit responsive to the detected signal provides output signals representative of shaft or gyroscope rotor speed and direction of rotation thereof.

DESCRIPTION OF THE PREFERRED EMBODIMENTS

Figures 1, 1A:
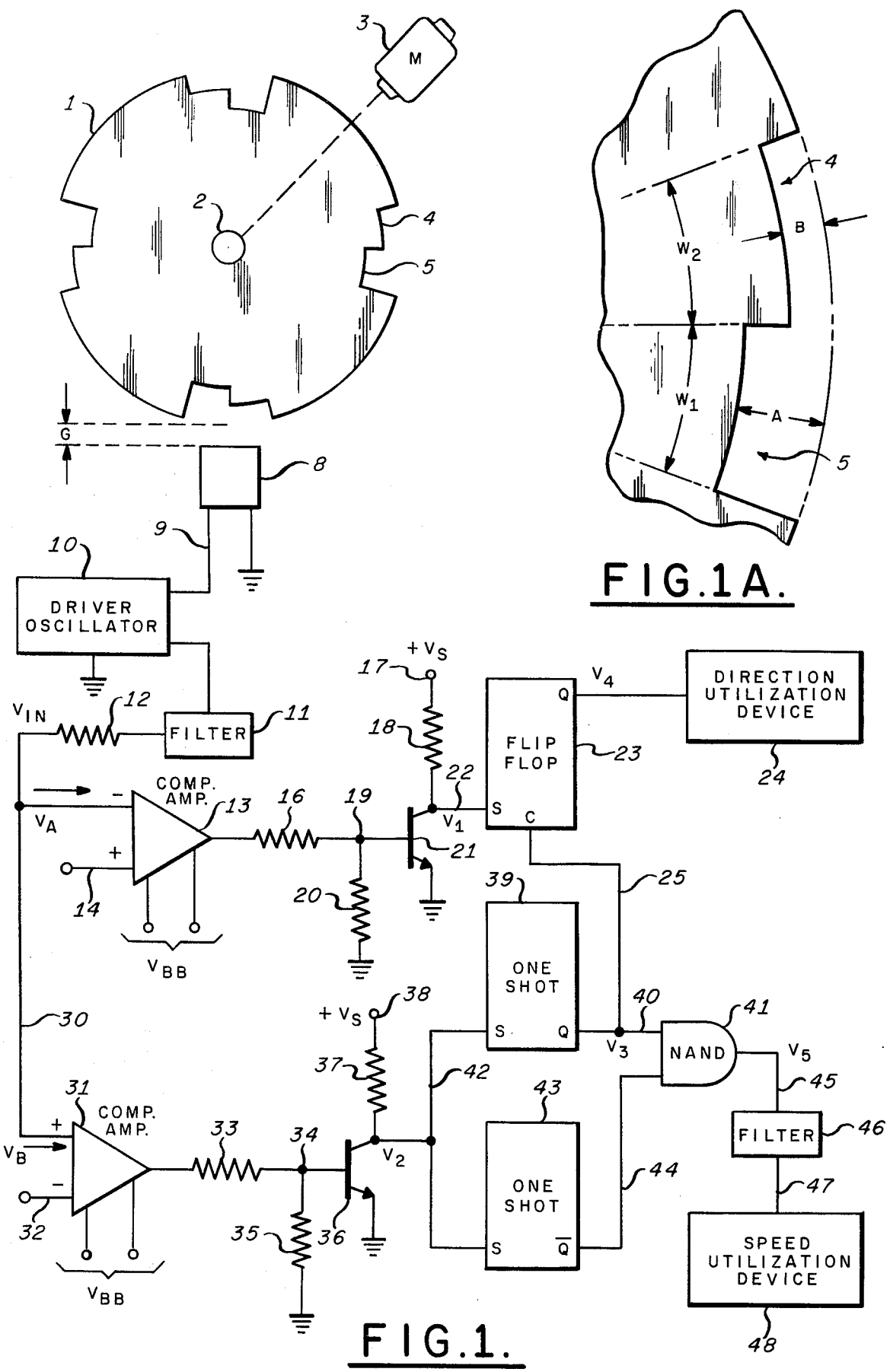
FIG. 1 is a plan view of the rotatable disc and eddy current sensor, together with a circuit diagram of the cooperating processor.
FIG. 1A is a fragmentary view on a larger scale of a portion of the rotor disc of FIG. 1.

The tachometric device of the present invention employs a round flat disc 1 of a metal such as aluminum affixed to a shaft 2 driven (at a speed to be measured) by a motor 3, for example, as shown in FIG. 1 and journalled in appropriate bearings (not shown). At spaced angular locations on the periphery of disc 1 are located similar sets of stair-stepped or asymmetric radial indentations or perturbations such as indentations 4 and 5 shown also in the enlarged scale drawing of FIG. 1A. In FIG. 1, four such sets are used, but one or more such sets may actually be employed. In one preferred form of the invention, the sets of stair-stepped perturbations are spaced apart by equal angles, through such equal angular spacing is not strictly necessary for practicing the invention. In one preferred form of the invention, the angular extents $W_1$ and $W_2$ of the stair-stepped or asymmetric radial perturbations such as 4 and 5 are equal, though they do not need to be strictly equal. The depth B of the step of angular extent $W_2$ is half of the depth A of the step of angular extent $W_1$.

The detect the rate and sense of rotation of disc 1, a generally conventional proximity sensing coil 8 is employed adjacent its perimeter. The sensor coil 8, which is placed at a gap distance G from the unmodified periphery of disc 1, is excited by high frequency currents (2mHz, for example) supplied by a conventional driver oscillator 10 via electrical lead 9.

Figure 2:
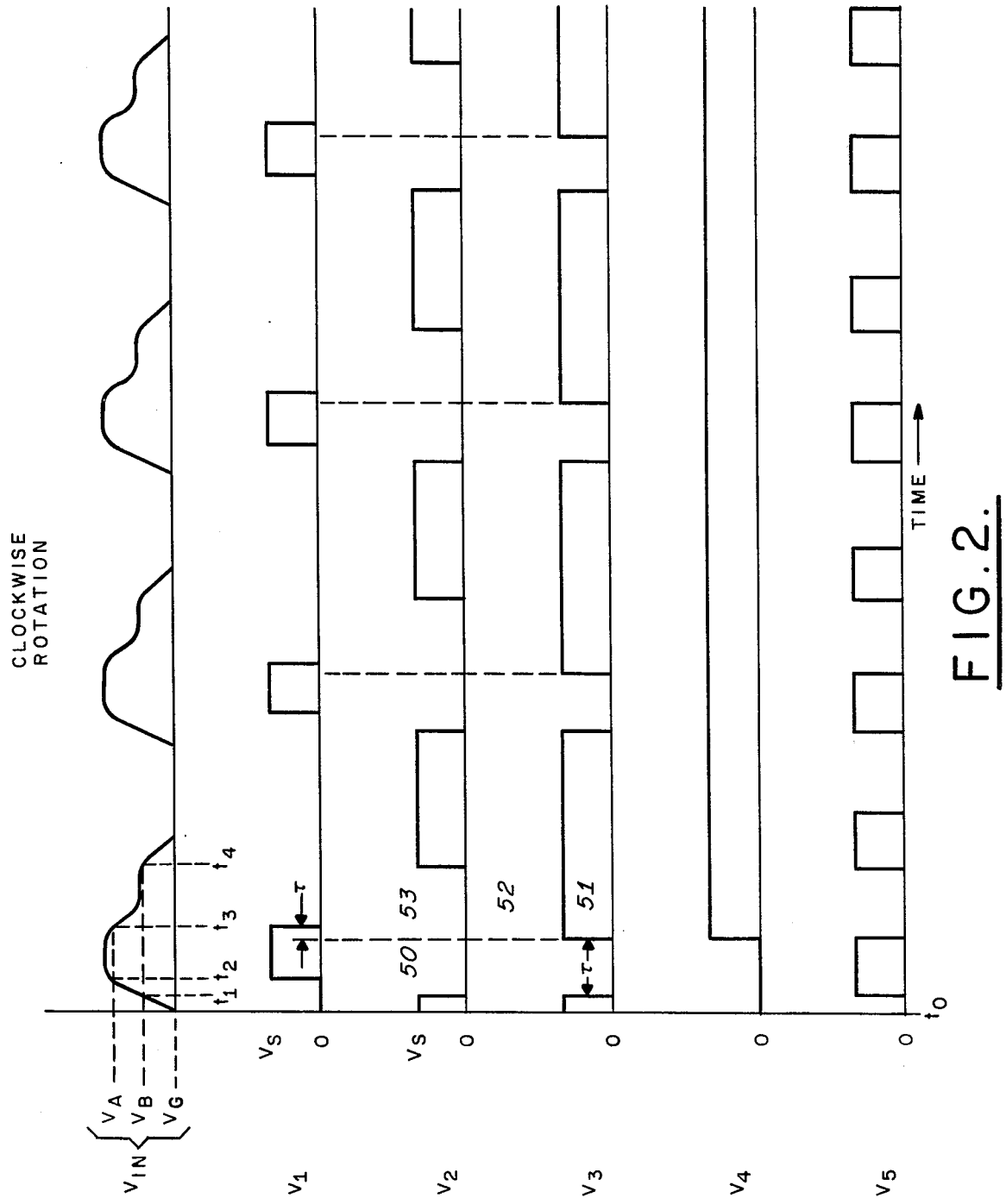
FIGS. 2 and 3 are graphs of wave forms useful in explaining the operation of the invention.

The electromagnetic field radiated by proximity coil 8 sets up eddy currents in the conventional manner at the peripheral portion of disc 1. Variation of the probe-to-surface distance at each stair-stepped indentation over and above the predetermined gap distance G inherently caused directly proportionate variation of the impedance of proximity coil 8; such variations cause corresponding changes in the loading of driver oscillator 10 and therefore in the alternating excitation current supplied via lead 9. As will be understood by those skilled in the oscillator art, such changes bring about corresponding changes in power supply currents feeding energy into driver oscillator 10. It will be readily understood that suitable amplitude modulated alternating carrier signals will thus be found in driver oscillator 10 when disc 1 is rotated; these may readily detected and processed, as by filter 11, to provide a variable unidirectional voltage whose amplitude is directly proportional to the instantaneous distance between coil 8 and the asymmetrically stepped surface of disc 1. The electrical output signal of filter 11, supplied through coupling resistor 12 to the measurement apparatus, accordingly has a stair - stepped wave form having the general appearance of the actual disc periphery; the instantaneous amplitude of the output of filter 11 is directly proportional to the particular instantaneous total gap between detector 8 and the disc surface; i.e. G, G + A, or G + B. It may be observed that an eddy current proximity sensor coil 8 is selected because its output level is dependent only upon distance or displacement and hence is independent of the speed of disc 1, this characteristic allowing zero speed detection, a prime consideration with respect to satellite control systems, for example. The dimensions of gaps G, A, and B are preferably so chosen that the corresponding unidirectional sensor outputs $V_G$, $V_A$, and $V_B$ as seen in FIG. 2 lie on the linear portion of the output characteristic of the sensor so as to minimize the rise and fall times of pulse-shaped signals to be derived therefrom. It will also be appreciated that the disc periphery may contain sets of radially stepped extensions instead of the sets of radial indentations shown in FIG. 1, or combinations thereof. The signal $V_{IN}$ flowing through resistor 12 is supplied via lead 30 to the separate inverting and non-inverting inputs of a pair of similar operational amplifiers 13 and 31. Reference signal unidirectional voltage levels are coupled to other inputs 14 and 32 of the amplifiers 13 and 31. Amplifiers 13, 31 are intended to operate as high gain voltage comparators. It will be understood that the voltage levels $V_A$ and $V_B$ may be applied through appropriately adjusted voltage dividers (not shown) to the inverting and non-inverting inputs to allow for otherwise adverse effects due to temperature or other variations in driver oscillator 10.

In the branching circuit containing operational amplifier 13, its output is coupled through resistor 16 to terminal 19 of the grounded input resistor 20 and to the base of an n-p-n transistor 21 whose emitter is grounded. The collector electrode of transistor 21 is supplied with an operating potential $+V_S$ at terminal 17 of resistor 18 and further couples a signal $V_1$ to the set input S of a conventional flip flop 23. As will be explained, a further input $V_3$ is supplied to the clock input of flip flop 23 via lead 25 from the Q terminal of one shot circuit 39 whose function is yet to be discussed. The Q output $V_4$ of flip flop 23 is coupled to a utilization device 24, which may be a rotor speed control system or a display device for indicating the direction of rotation of disc 1, for example.

In the branching circuit containing operational amplifier 31, its output is coupled through resistor 33 to terminal 34 to the grounded input resistor 35 and to the base of a transistor 36 similar to transistor 21, whose emitter is grounded. The collector electrode of transistor 36 is supplied with an operating potential $+V_S$ at terminal 38 of resistor 37 in the conventional manner and further couples a signal $V_2$ to the set inputs S of similar conventional one shot circuits 39 and 43. As noted, the Q output $V_3$ of one shot 39 is connected via lead 25 to the clock input C of flip flop 23. The Q and $\bar{Q}$ outputs of the respective one shot circuits 39 and 43 are respectively coupled by leads 40 and 44 to the input leads of the conventional NAND gate 41. The pulsed output of NAND gate 41 is coupled by lead 45 through filter 46 and thence via lead 47 to a second utilization device 48 which again may be a rotor speed control system or a display or other device for indicating or utilizing a measure of the speed of rotation of disc 1.

It will be understood that rotation of disc 1 generates a stair-stepped voltage wave $V_{IN}$ on lead 30, the eddy current sensor coil 8 providing voltage amplitudes respectively related to the dimensions G + A and G + B, which voltages are respectively designated in FIG. 2 as $V_A$ and $V_B$. FIG. 2 represents the situation for clockwise rotation of disc 1, with time $t_o$ representing an arbitrary time at which a measurement is to be made. At the time $t_o$, disc 1 is moving in the clockwise direction, the leading edge of perturbation 5 being proximate detector coil 8. Before time $t_1$, when voltage $V_{IN}$ reaches the value $V_B$, the outputs of amplifiers 13 and 31 are substantially equal to the supply voltage $V_B$ and opposite in polarity, with the output of amplifier 13 being voltage + $V_{BB}$. When $V_{IN}$ reaches $V_B$ at time $t_1$, the output of amplifier 31 swings positive to $+V_{BB}$, which amplifier 13 continues to supply voltage + $V_{BB}$, amplifiers 13 and 31 behaving as high gain or open loop voltages comparators. These comparator devices shape the incoming proximity signal $V_{IN} \pm V_{BB}$ square waves whose leading and trailing edges are timed by the values of $V_B$ and $V_A$. Transistors 21 and 36 and their associated resistors act as level-shifting, coupling amplifiers, clipping negative going portions from waves $V_1$ and $V_2$ and making the positive going portions of the waves compatible in level with the logic used in the following circuits in the usual manner.

Therefore, from time $t_o$ to time $t_1$, the $V_1$ and $V_2$ outputs of transistors 21 and 36 are zero and + $V_s$, respectively. The $V_2$ output of transistor 36 goes low at time $t_1$ and, when $V_{IN}$ reaches $V_A$ at time $t_2$, the output of amplifier 13 swings negative to $-V_{BB}$ volts, while wave $V_2$ stays constant at a low level. From time $t_2$ to time $t_3$, voltages $V_1$ and $V_2$ are $+V_s$ and zero respectively. The lagging edge 50 of wave $V_2$ at time $t_1$ causes the Q output $V_3$ from one shot circuit 39 to go low and to remain low for $\tau$ seconds. The wave $V_3$ is coupled to the clock input C of flip flop 23 and is also coupled to an input of NAND gate 41.

At time $t_3$, voltage $V_{IN}$ falls below $V_A$ and the voltage $V_1$ drops to zero. The time constant $\tau$ of one shot circuit 39 is selected so that the leading edge 51 of its output occurs $\tau$ d seconds prior to time $t_3$. In other words, $\tau$ d is selected to be greater than the maximum trailing edge jitter of one shot circuit 39. Both voltages $V_1$ and $v_3$ are inputs of flip flop 23. The output $V_4$ of flip flop 23 will latch to whatever level of voltage $V_1$ coincides in time to the leading edge of the clock input voltage $V_3$. Hence, the dotted line 52 at the leading edge of wave $V_3$ is always coincident with a high value of $V_1$, which event latches $V_4$ high at time $t_3$- $\tau$ d for the indication of clockwise rotation. The positive voltage $V_4$ at utilization device 24 representing clockwise rotation of disc 1 may be used to control a rotor control servo or may be indicated by a lamp or by a simple electrical meter movement, for example.

At time $t_4$, voltage $V_{IN}$ is lower than $V_B$ and $V_2$ consequently rises to $V_s$. The leading and trailing edges 53 and 50 of wave $V_2$ trigger one shot circuits 39 and 43, respectively forming pulses $V_2$ which are then coupled into NAND gate 41. The four wave excursions of the $V_{IN}$ graph of FIG. 2 represent the case for the four stepped indentations of FIG. 1 and they produce, for each revolution of disc 1, the eight positive impulses of wave $V_5$ at the output of NAND gate 41. Wave $V_5$ is representative of the speed of disc 1, so that its pulses may be converted by filter 46 into a smoothed unidirectional current for utilization by a rotor speed control system 48 or for presentation, for example, on a direct current meter. There is one pulse formed in wave $V_5$ for each trailing and leading edge of the pulses of wave $V_2$.

Figure 3:
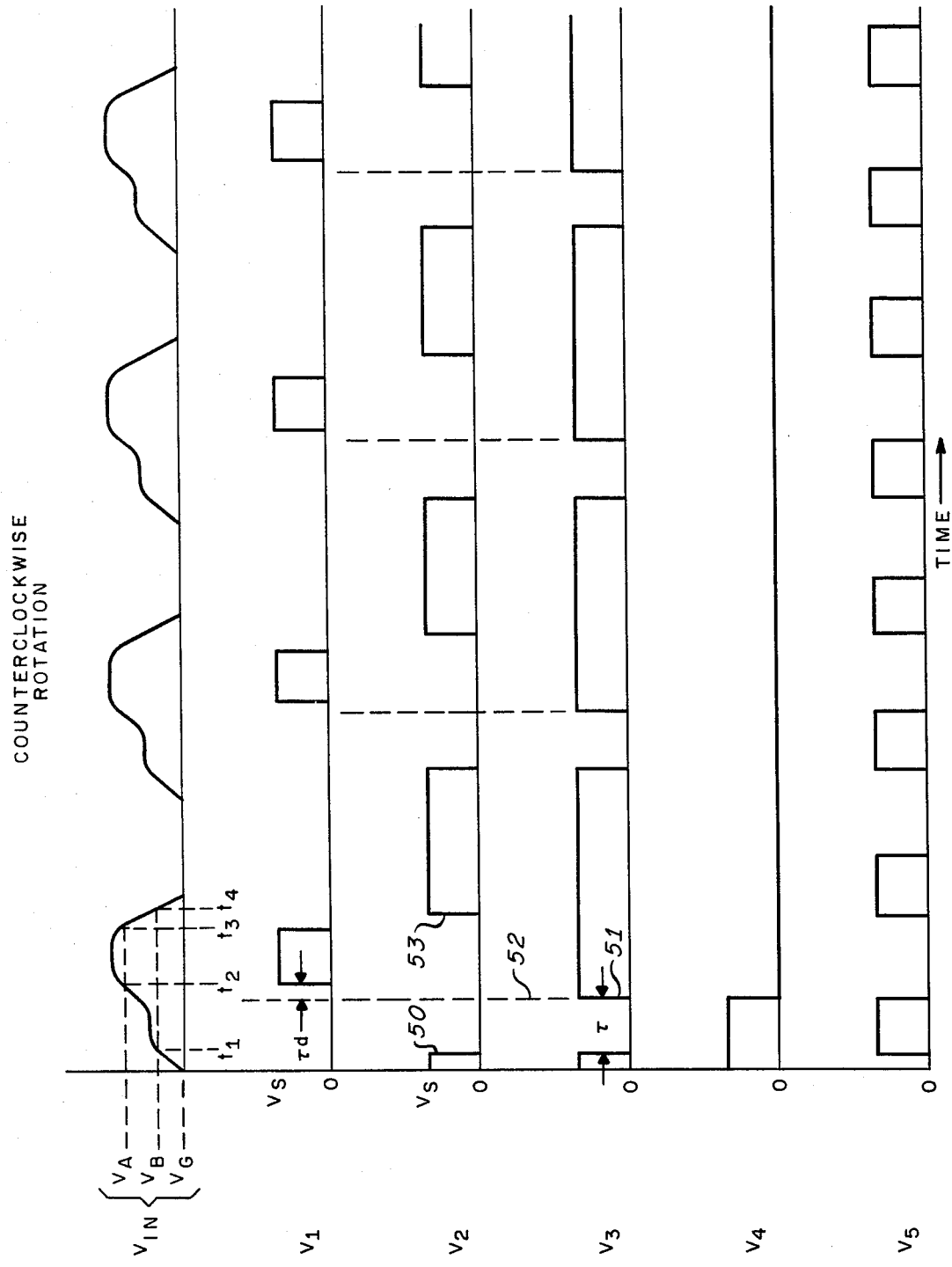

It will readily be seen that the manner of operation of the invention for counter-clockwise rotation of disc 1, with wave forms as shown in FIG. 3, is generally similar to its clockwise operation (FIG. 2). However, the direction of rotation of disc 1 being reversed, the direction of the stairstepped wave $V_{IN}$ is reversed, causing the pulses of wave $V_1$ to occur later in time than in FIG. 2; i.e., $t_2$ for the counterclockwise case is later than $t_2$ for the clockwise case. Since $\tau$ for the one shot circuit 39 is a constant, the trailing edges of the output pulses of wave $V_3$ now occur during the low voltage periods of wave $V_1$. One shot circuit 39 therefore latches so as to produce a zero output $V_4$, so that apparatus 24 responds to the zero voltage, indicating counterclockwise rotation of disc 1.

The invention has utility as a shaft speed of rotation pick-off over a wide range of clockwise and counterclockwise speeds and may also readily be adapted to the measurement of positive and negative linearly translational speeds. Wherever extremely high resolution of tachometer speed is not of prime significance and simplicity, low cost, and compactness are requisites, the novel sensor is particularly attractive. Such is the case because a single uncomplex and compact eddy current sensor coil will now only provide measurement of clockwise and counterclockwise shaft speeds, but may also readily be adapted to yield a signal representing direction of rotation. In one design of the device for operation to a maximum of 2100 revolutions per minute, speed read out is accurately accomplished from the extreme maximum speeds through zero revolutions per minute, while sense of rotation information is provided from the extreme maximum shaft speeds to substantially one per cent of the maximum speed.

The width of the narrow erroneous band at one side of zero revolutions per minute can readily be minimized by observing certain design considerations. For example, at some very low counterclockwise shaft speed, the leading edges of the $V_1$ pulses begin to lag the trailing edges of the $V_4$ pulses, producing the erroneous indication that clockwise operation is actually occurring when it is not. To ensure accurate directional sensing information at maximum shaft speed with as large a total speed range as possible, the value of $\tau$ is selected so that the trailing edges of the pulses of wave $V_4$ leads the trailing edges of the pulses of wave $V_1$ by a predetermined small amount $\tau$ d. The angular widths $W_1$ and $W_2$ are made as large as is practically feasible and the voltage ratio $V_B/V_A$ is designed to be substantially unity, these design requirements being selected with the predetermined maximum shaft rotational speed in mind.

In the example for which the design maximum speed is ±2100 revolutions per minute, the rotation sense display 24 is not accurate merely between zero and 35.7 revolutions per minute, which in many applications will be of little significance. It should be observed that no analogous problem occurs in the display of counterclockwise directional sense data, because the leading edge of each $V_1$ pulse always occurs later in time than the trailing edge of each corresponding $V_3$ pulse. While the disc 1 is illustrated as being provided with radial perturbations, it will be understood that perturbations may instead be provided in an axial direction. Thus, the perturbations may take the form of raised or lowered portions of the major surface of disc 1, with a corresponding axial repositioning of coil 8 to sense those axial perturbations.

While the invention has been described in its preferred embodiments, it is to be understood that the words which have been used are words of description rather than of limitation and that changes within the purview of the appended claims may be made without departing from the true scope and spirit of the invention in its broader aspects.

I claim:

1. Apparatus for measuring rate and direction of motion comprising:
    motive means operable in clockwise and counterclockwise directions,
    rotor means coupled for rotation by said motive means and having an electrically conductive circular peripheral portion,
    coil means adjacent said circular peripheral portion for exciting eddy currents therein,
    said circular portion having spaced-apart asymmetric portions therein each comprising first and second discrete contiguous radial perturbations of said circular peripheral portion,
    said coil means additionally having first and second discrete reflected impedance responses during the passage thereby of each said spaced-apart asymmetric perturbations, and
    first circuit means responsive to said first and second discrete reflected impedance responses for yielding a measure of said rate of rotation.

2. Apparatus as described in claim 1 further including second circuit means responsive to said first or said second discrete reflected impedance responses and to said first circuit means for yielding a signal indicative of said direction of rotation.

3. Apparatus as described in claim 1 further including means for utilizing said measure of said rate of rotation.

4. Apparatus as described in claim 3 further including means for utilizing said signal indicative of said direction of rotation.

5. Apparatus as described in claim 1 wherein said first and second discrete contiguous radial perturbations of said circular peripheral portion form stepped radial indentations therein.

6. Apparatus as described in claim 1 additionally including:
    driver oscillator means for exciting said coil means, said driver oscillator means oscillating at first and second levels in response to said first and second reflected impedance responses.

7. Apparatus as described in claim 1 wherein said first circuit means comprises:
    voltage comparator means,
    coupling amplifier means responsive to said voltage comparator means for producing one output pulse during the passage of said first discrete contiguous radial perturbation,
    pulse circuit means responsive to said one pulse for producing first and second spaced pulses, and
    conversion means for converting said first and second spaced pulses into a unidirectional current of amplitude varying in response to the spacing therebetween, and
    utilization means responsive to said variable unidirectional current.

8. Apparatus as described in claim 2 wherein said second circuit means comprises:
    voltage comparator means, coupling amplifier means responsive to said voltage comparator means for generating one output pulse during the passage of said first discrete contiguous radial perturbation, and flip-flop circuit means responsive to said one output pulse and to said second circuit means for producing a first output signal of one level in response to clockwise rotation of said motive means and a second output signal of a second level in response to counterclockwise rotation thereof.

* * * * *